United States Patent [19]

Lum

[11] Patent Number: 4,580,197

[45] Date of Patent: Apr. 1, 1986

[54] LIGHT COLLIMIZING DEVICE

[75] Inventor: Thomas F. Lum, Austin, Tex.

[73] Assignee: Motorola, Inc., Schaumburg, Ill.

[21] Appl. No.: 704,231

[22] Filed: Feb. 22, 1985

[51] Int. Cl.$^4$ ............................................. F21V 33/00
[52] U.S. Cl. ..................................... 362/85; 362/256; 362/300; 362/346
[58] Field of Search ................ 362/297, 61, 64, 85, 362/86, 301, 303, 305, 300, 307, 346, 29, 23, 28, 26, 255, 256, 36, 257, 298, 300, 347

[56] References Cited

U.S. PATENT DOCUMENTS

| 1,230,844 | 6/1917 | Blair et al. . | |
| 1,232,046 | 7/1917 | Kleinert . | |
| 1,300,202 | 4/1919 | Stubblefield | 362/346 |
| 1,445,306 | 2/1923 | Epstein | 362/301 |
| 1,519,345 | 12/1924 | Allen | 362/301 |
| 1,734,834 | 11/1929 | Steward et al. | 362/61 |
| 1,913,517 | 6/1933 | Smith et al. . | |
| 2,118,420 | 11/1933 | Spratley | 362/307 |
| 2,673,291 | 3/1954 | Moss . | |
| 3,586,851 | 6/1971 | Rudolph | 362/301 |
| 3,588,492 | 6/1971 | Pollock . | |
| 4,037,096 | 7/1977 | Brendgord et al. . | |

FOREIGN PATENT DOCUMENTS 630818 12/1927 France ................................ 362/301

Primary Examiner—Craig R. Feinberg
Assistant Examiner—David A. Okonsky
Attorney, Agent, or Firm—Donald B. Southard; Steven G. Parmelee

[57] ABSTRACT

A light collimizing device (10) having a light input unit (11), a first light reflection unit (12), a window unit (13) and a second light reflection unit (14). The light input unit (11) allows light rays (18 and 19) to enter therethrough. Some of the light rays (18) are reflected off of the second light reflection unit (b 14), and some of the light rays (19) are reflected off of the window unit (13). All of the reflected rays (18 and 19) are then reflected off of the first light reflection unit (12) to yield a plurality of collimized light rays (17).

15 Claims, 2 Drawing Figures

LIGHT COLLIMIZING DEVICE

TECHNICAL FIELD

This invention relates generally to light sources, and more particularly to light sources capable of providing collimated light.

BACKGROUND ART

Collimated light occurs when a plurality of light rays are aligned substantially parallel to one another, as results when locating a point source of light at the focus of a reflecting paraboloidal structure. Collimated light has many desirable applications. For instance, collimated light has widespread use with automotive headlamps and in color displays where a uniform intensity of color must be displayed from one side of the display to the other. In addition, the use of collimated light permits the masking of certain colors when desired through resort to well known filtering techniques.

Though collimated light has many known desirable uses, such light can often not be effectively used due to certain inherent physical limitations. For instance, the focal point for the light source must be located a specified distance from the collimizing reflection surface, and this distance will often exceed the space limitations that must be met.

There therefore exists a need for a light collimizing device that minimizes such space requirements, and that particularly minimizes the required distance between the focal point and the collimizing reflecting surface by providing a folded light path.

SUMMARY OF THE INVENTION

These needs and others are substantially met through provision of the light collimizing device disclosed herein. This device may be generally formed of an integral transparent member. This transparent member includes generally a light input unit, a first light reflection unit, a window unit and a second light reflection unit.

In a preferred embodiment, the light input unit may be comprised of a concave indentation formed in the member. In order to avoid any lensing effect, the indentation may be substantially spherical in shape. A light source that will provide the light rays to be collimized by the device may be placed at the focus of the spherical shaped indentation.

The first light reflection unit may be formed of a substantially paraboloidal shaped surface having a reflective coating disposed on this surface.

The window unit may be comprised of a planar surface positioned above the first light reflection unit. The window unit serves both to reflect light rays as introduced through the light input unit, and also to transmit therethrough light rays that are reflected off of the first light reflection unit.

Finally, the second light reflection unit may be comprised of a reflective surface that also serves to reflect light rays from the light input unit. The second light reflection unit and the window unit are disposed substantially co-planar to one another. More importantly, the second light reflection unit serves to reflect light from the light input unit that the window unit would not otherwise cause to be reflected due to the angle of incidence between the light rays and that particular portion of the window unit.

In use, a light source located at the focus of the light input unit causes a first and second plurality of light rays to enter the member. The first plurality of light rays contact the second light reflection unit and are reflected off of the reflective surface towards the first light reflection unit. The second plurality of light rays are reflected off of the window unit and towards the first light reflection unit as well, due to the angle of incidence between the window unit and the second plurality of rays. Both the first and second plurality of rays are then reflected off of the first light reflection unit and pass through the window unit as a plurality of parallel aligned light rays.

This collimized light output can be achieved through use of this device even though the actual focus of the light source has been positioned below the window unit because the device folds the light path to treat the light source as having an apparent focus position above the window unit. Therefore, a useful collimized light output can be realized in a minimum of space.

BRIEF DESCRIPTION OF THE DRAWINGS

These and other attributes of the invention will become more clear upon a thorough review and study of the following description of the best mode for carrying out the invention, particularly when reviewed in conjunction with the drawings, wherein.

BEST MODE FOR CARRYING OUT THE INVENTION

Figure 2:
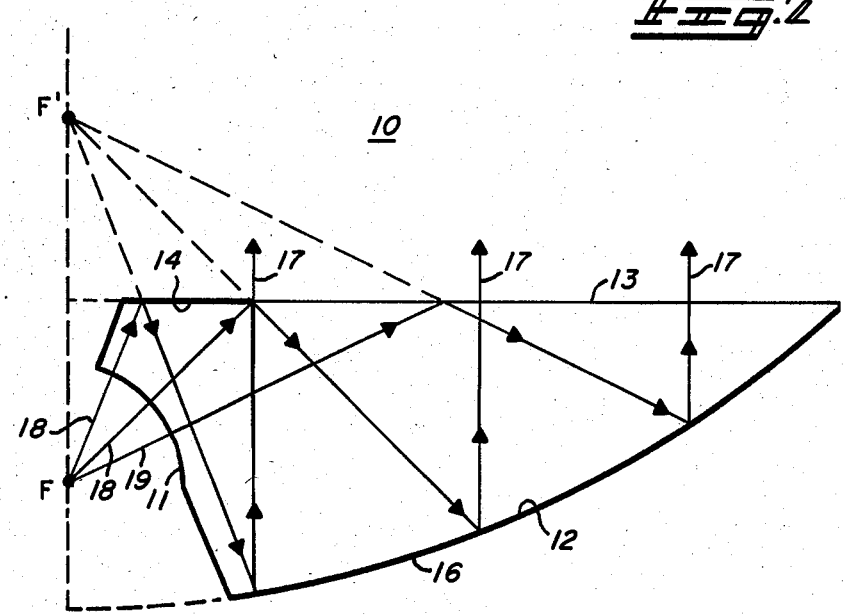
FIG. 2 comprises a top plan diagramatic view of the device.

Referring now to the drawings, and in particular to FIG. 2, the device may be seen as depicted generally by the numeral 10. The device (10) includes generally a light input unit (11), a first light reflection unit (12), a window unit (13) and a second light reflection unit (14). Each of these components will now be described in more detail in seriatim fashion.

With continued reference to FIG. 2, the light collimizing device (10) may be formed of an integral member comprised of transparent material such as glass or acrylic plastic. The overall dimensions of the device (10) can be selected as appropriate to accomodate the requirements and limitations of a particular application.

The light input unit (11) includes a concave indentation formed along a first side of the transparent member. In this particular embodiment, the indentation has been provided with a generally spherical shape in order to eliminate any lens effect that might interfere with the intended function of the device (10). If desired for a particular application, the light input unit (11) could be provided with other than a spherical shape to take advantage of such a resulting lens effect.

The first light reflection unit (12) can be formed of a curved surface disposed along a second side of the transparent member. In order to assure a collimized light output, this curved surface should be formed as a paraboloidal surface. In addition, a light reflective coating, such as silver or aluminum, may be uniformly disposed along the outer surface (16) of the first light reflection unit (12).

The window unit (13) may be formed of yet another side of the transparent member as indicated. This side should be comprised of a substantially planar surface disposed substantially opposite above the first light reflection unit (12).

Finally, the second light reflection unit (14) may be comprised of a substantially planar reflective coating positioned substantially adjacent the light input unit (11) and disposed substantially co-planar with the window unit (13).

The operation of the device (10) may now be described.

With continued reference to FIG. 2, the first light reflection unit (12) has an apparent focus as indicated by the character F'. Therefore, a light source placed at F' would yield a plurality of collimized light rays (17) as reflected off of the first light reflection unit (12) (presuming that all such light rays could pass through the window unit (13) without refractive effects).

By placing the light source at the actual focus, as designated by the character F, the same plurality of collimized light rays (17) can be realized without positioning the light source above the device (10). More particularly, it should be appreciated that a light source positioned at F will transmit a first and second plurality of light rays.

The first plurality of light rays (18) will be received through the light input unit (11) and will be reflected off of the second light reflection unit (14). The second plurality of light rays (19) will be reflected off of the window unit (13). Substantially all of these light rays (18 and 19) will be reflected off of the first light reflection unit (12) in a collimized state to yield a plurality of collimized light rays (17). By providing a folded light path for the light rays (18 and 19) that emanate from the light source, a relatively wide span of collimized light rays (17) may be realized from the device (10) in a minimum of space.

Figure 1:
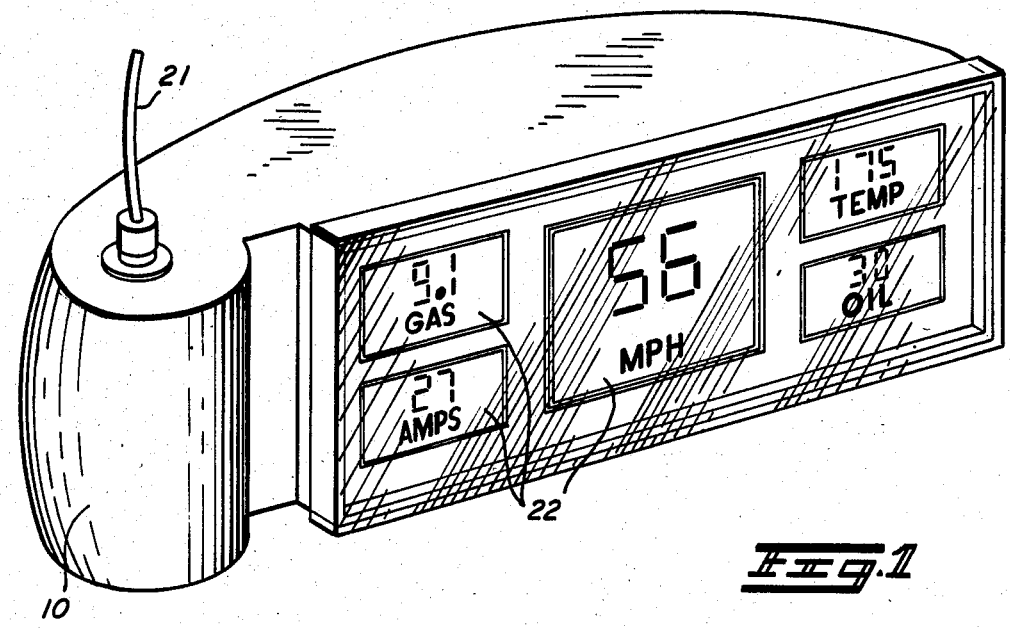
FIG. 1 comprises a perspective view of an automobile display panel having the device constructed in accordance with the present invention associated therewith.

It may be noted that, for a refractive media such as acrylic plastic, substantially total internal reflection will result whenever a light ray impinges on the optical interface at an angle greater than or equal to $\sin^{-1}$ (1/index of refraction) relative to an angle of 90°. For acrylic plastic having an index of refraction of 1.489, this critical angle would be 42.2°. Therefore, to avoid gaps in the collimized light output, the second light reflection unit (14) should be positioned with respect to the light input unit (11) to extend at least far enough to intercept light rays having an angle of incidence of 42.2° or more when using this material. With reference to FIG. 1, one application of the device (10) can be seen that makes advantageous use of this feature. The device (10) can be disposed within a container having a light source (21) fit therein such that the light source itself is positioned at the actual focal point F of the device (10). The resulting collimized light rays can then be utilized to provide uniform back lighting for the display gauges (22) as indicated. If the light source (21) were required to be placed at the apparent focal point F', such an application could not be satisfactorily realized.

There are of course numerous modifications that could be made to this configuration that will be apparent to those skilled in the art. Such modifications are not to be considered outside the scope of the claims unless specifically limited thereby.

I claim:

1. A collimizing device comprising:
   (a) light input means for receiving a first and second plurality of light rays to be collimized;
   (b) first light reflection means for reflecting at least a substantial portion of said first and second plurality of light rays in a substantially collimized state;
   (c) window means including a first substantially planar member for reflecting at least a portion of said first plurality of uncollimized light rays onto said first light reflection means, and for transmitting therethrough at least a portion of said collimized light rays as reflected off of said first light reflective means; and
   (d) second light reflection means having a reflective side for reflecting at least a portion of said second plurality of uncollimized light rays onto said first light reflection means, said second light reflection means comprising a second substantially planar member that is positioned substantially parallel with respect to said first substantially planar member.

2. The device of claim 1 wherein said light input means includes a transparent member having an indentation formed therein.

3. The device of claim 2 wherein said indentation is spherically shaped.

4. The device of claim 1 wherein said second light reflection means and said window means are formed of substantially planar member.

5. The device of claim 4 wherein said second light reflection means and said window means are disposed substantially co-planar to one another.

6. The device of claim 1 wherein said first light reflection means includes a paraboloidal shaped surface.

7. The device of claim 6 wherein said first and second plurality of light rays are originated from substantially a single focal point.

8. The device of claim 7 wherein said single focal point is positioned on said reflective side of said second light reflection means, with a resulting apparent focal point being located on the opposing side thereof.

9. The device of claim 1 wherein said light collimizing device may be comprised of a single integrally formed member.

10. The device of claim 9 wherein said device is comprised of a substantially transparent material.

11. The device of claim 10 wherein said first light reflection means includes a light reflecting finish disposed on a part of said member.

12. A light collimizing device comprising an integral member formed of a substantially transparent material, said member having:
   (a) a first side having a substantially spherically shaped indentation formed therein;
   (b) a second side formed substantially in a paraboloidal shape, at least part of said second side having a reflective surface disposed thereon; and
   (c) a third side disposed substantially opposite said second side and comprising a substantially planar surface, said third side having a transparent portion and a reflective portion; such that a first and second plurality of light rays may enter said member through said indentation, with said first plurality of light rays being reflected towards said second side by said reflective portion of said third side and said second plurality of light rays being reflected towards said second side by said transparent portion of said third side, such that said first and second plurality of light rays are then reflected off of said second side in a substantially collimized state and transmitted out of said member through said transparent portion of said third side.

13. A light collimizing device comprising:
(a) light input means for receiving a first and second plurality of light rays to be collimized, wherein said first and second plurality of light rays are originated from substantially a single focal point;
(b) first light reflection means including a paraboloidal shaped surface for reflecting at least a substantial portion of said first and second plurality of light rays in a substantially collimized state;
(c) window means for reflecting at least a portion of said first plurality of uncollimized light rays onto said first light reflection means, and for transmitting therethrough at least a portion of said collimized light rays as reflected off of said first light reflective means; and
(d) second light reflection means having a reflection side for reflecting at least a portion of said second plurality of uncollimized light rays onto said light reflection means; wherein said single focal point is positioned on said reflective side of said second light reflection means with a resulting apparent focal point being located on the opposing side thereof.

14. A light collimizing device comprising:
(a) light input means for receiving a first and second plurality of light rays to be collimized;
(b) first light reflection means for reflecting at least a substantial portion of said first and second plurality of light rays in a substantially collimized state;
(c) window means for reflecting at least a portion of said first plurality of uncollimized light rays onto said first light reflection means, and for transmitting therethrough at least a portion of said collimized light rays as reflected off of said first light reflection means; and
(d) second light reflection means having a reflective side for reflecting at least a portion of said second plurality of uncollimized light rays onto said first light reflection means, wherein said second light reflection means and said window means are formed of a substantially planar member.

15. The device of claim 14 wherein said second light reflection means and said window means are disposed substantially coplanar to one another.

* * * * *